(12) United States Patent
Sato et al.

(10) Patent No.: US 10,197,424 B2
(45) Date of Patent: Feb. 5, 2019

(54) ULTRASONIC FLOWMETER HAVING TRANSCEIVERS DRIVING AND RADIALLY PRESSING THE FLOW TUBE TO INCREASE AMPLITUDE OF THE ULTRASONIC WAVE

(71) Applicants: NATIONAL INSTITUTE OF ADVANCED INDUSTRIAL SCIENCE AND TECHNOLOGY, Tokyo (JP); ATSUDEN CO., LTD., Tokyo (JP)

(72) Inventors: Harumichi Sato, Ibaraki (JP); Jun Akedo, Ibaraki (JP); Eiichi Murakami, Tokyo (JP)

(73) Assignees: NATIONAL INSTITUTE OF ADVANCED INDUSTRIAL SCIENCE AND TECHNOLOGY, Tokyo (JP); ATSUDEN CO., LTD., Tokyo (JP)

( * ) Notice: Subject to any disclaimer, the term of this patent is extended or adjusted under 35 U.S.C. 154(b) by 123 days.

(21) Appl. No.: 15/352,681

(22) Filed: Nov. 16, 2016

(65) Prior Publication Data

US 2017/0059379 A1    Mar. 2, 2017

Related U.S. Application Data

(63) Continuation of application No. PCT/JP2015/065291, filed on May 27, 2015.

(30) Foreign Application Priority Data

May 28, 2014    (JP) .................. 2014-110453

(51) Int. Cl.
*G01F 1/66*    (2006.01)

(52) U.S. Cl.
CPC ............ *G01F 1/662* (2013.01); *G01F 1/66* (2013.01); *G01F 1/667* (2013.01)

(58) Field of Classification Search
None
See application file for complete search history.

(56) References Cited

U.S. PATENT DOCUMENTS 3,964,308 A * 6/1976 Scarpa ............... G01F 1/66
                                              73/861.27
4,164,865 A * 8/1979 Hall ..................... G01F 1/66
                                              73/861.28

(Continued)

FOREIGN PATENT DOCUMENTS

EP    1109016 A2    6/2001
GB    2400439 A    10/2004

(Continued)

OTHER PUBLICATIONS

European search report dated Nov. 6, 2017 for the corresponding European Patent Application No. 15799778.4.

(Continued)

*Primary Examiner* — Harshad R Patel
(74) *Attorney, Agent, or Firm* — Typha IP LLC (57) ABSTRACT

An ultrasonic flowmeter capable of increasing the amplitude of, and the receiving sensitivity for, an excited signal is provided. The ultrasonic flowmeter according to the present invention includes two or more ultrasonic transducers on a transmission side and two or more ultrasonic transducers on a receiving side, located as being away from each other on an outer surface of a tube having a fluid flowing therein. The two or more ultrasonic transducers located on the transmission side are driven so as to press the tube at substantially the same pressure to increase an amplitude of an ultrasonic wave. The ultrasonic flowmeter according to the present invention includes adjustment members converting an ultra- (Continued)

sonic signal into an ultrasonic signal suitable to measurement between the tube and the ultrasonic transducers. The adjustment members each have a curved surface or a groove at a surface thereof contacting the tube.

9 Claims, 11 Drawing Sheets

(56) References Cited

U.S. PATENT DOCUMENTS

| | | | | |
|---|---|---|---|---|
| 4,628,725 | A * | 12/1986 | Gouilloud | E21B 47/101 73/861.27 |
| 5,052,230 | A * | 10/1991 | Lang | G01F 1/667 73/861.28 |
| 6,055,868 | A | 5/2000 | Koyano et al. | |
| 6,412,354 | B1 * | 7/2002 | Birchak | G01N 9/002 73/861.27 |
| 6,601,458 | B1 * | 8/2003 | Gysling | G01F 1/74 73/861.04 |
| 7,980,127 | B1 | 7/2011 | Hou | |
| 8,714,030 | B1 * | 5/2014 | Liu | G01F 1/662 73/861.28 |
| 2007/0151361 | A1 * | 7/2007 | Kamimura | G01F 1/662 73/861.27 |
| 2010/0192703 | A1 * | 8/2010 | Huang | G01F 1/66 73/861.28 |
| 2012/0272747 | A1 | 11/2012 | Sato et al. | |
| 2012/0318069 | A1 | 12/2012 | Murakami | |
| 2013/0104667 | A1 | 5/2013 | Koyano | |
| 2014/0033827 | A1 * | 2/2014 | Satou | G01F 1/662 73/861.27 |
| 2015/0143919 | A1 * | 5/2015 | Nakano | G01F 1/66 73/861.28 |
| 2015/0211904 | A1 * | 7/2015 | Forster | G01F 1/662 73/861.28 |

FOREIGN PATENT DOCUMENTS

| | | |
|---|---|---|
| JP | H10-122923 A | 5/1998 |
| JP | 2006-349439 A | 12/2006 |
| JP | 2007-298275 A | 11/2007 |
| JP | 2011-112499 A | 6/2011 |
| JP | 4875780 B2 | 2/2012 |
| JP | 4878653 A | 2/2012 |
| JP | 4940384 B1 | 5/2012 |
| JP | 4991972 B1 | 8/2012 |
| JP | 5142350 B2 | 2/2013 |
| JP | 5201525 B2 | 6/2013 |
| JP | 2014-509733 A | 4/2014 |
| JP | 5582480 B2 | 9/2014 |
| JP | 5655194 B2 | 1/2015 |
| WO | 97/24585 A | 7/1997 |
| WO | 2012/129101 A1 | 9/2012 |

OTHER PUBLICATIONS

Korean Office Action dated Jan. 6, 2018 for the corresponding Korean Patent Application No. 10-2016-7032149 with partial English translation.
Japanese Decision to Grant dated Feb. 14, 2017 for corresponding JP Application No. 2016-523542.
English Translation of the Written Opinion dated Jun. 23, 2015 of the International Search Authority for PCT/JP2015/065291.
International Search Report completed on Jun. 11, 2015 for PCT/JP2015/065291.
Written Opinion of the International Searching Authority dated Jun. 23, 2015 for PCT/JP2015/065291.
Karean Office Action dated Jul. 25, 2018 for the corresponding Korean Patent Appiication No. 10-2016-7032149 with partial English translation.
Chinese Office Action dated Aug. 30, 2018 for the corresponding Chinese application No. 201580025170.8, with partial English translation.
European Office Action dated Sep. 12, 2018 for the corresponding European Application No. 15799778.4.
Result of consultation dated Sep. 27, 2018 for the corresponding European Application No. 15799778.4.

* cited by examiner

FIG.1

PRIOR ART

1 PZT each

Amplification value
Gain = (40,277)

FIG.10B

2 PZTs each

Amplification value
Gain = (40,33)

ULTRASONIC FLOWMETER HAVING TRANSCEIVERS DRIVING AND RADIALLY PRESSING THE FLOW TUBE TO INCREASE AMPLITUDE OF THE ULTRASONIC WAVE

CROSS REFERENCE TO RELATED APPLICATIONS

This application is based upon and claims the benefit of priority from the prior Japanese Patent Application No. 2014-110453, filed on May 28, 2014, and PCT Application No. PCT/JP2015/065291, filed on May 27, 2015, the entire contents of which are incorporated herein by reference.

FIELD

The present invention relates to an ultrasonic flowmeter including an ultrasonic transducer.

BACKGROUND

Figure 1:
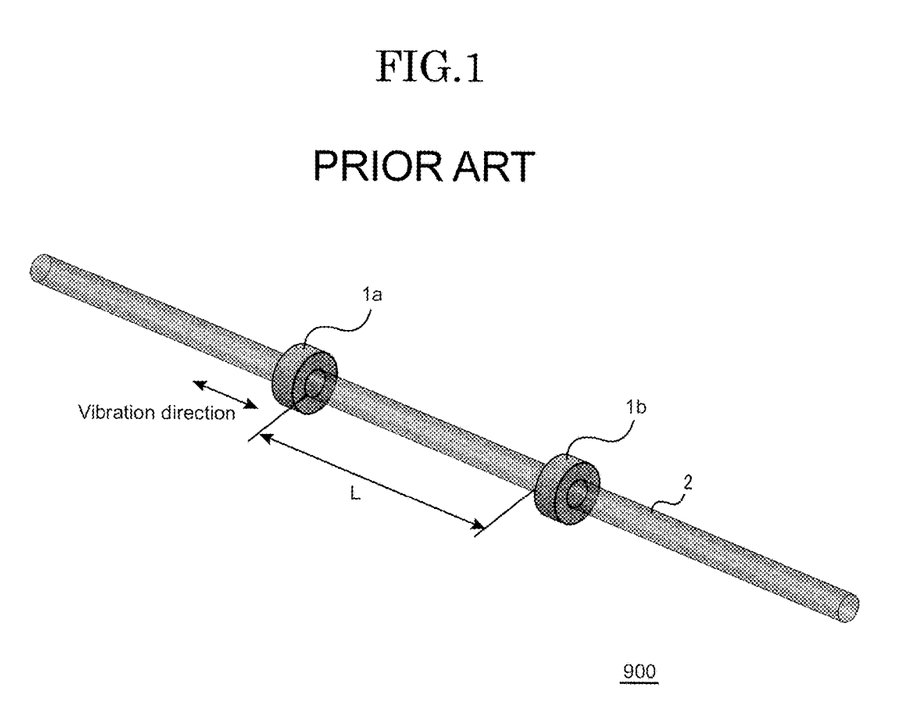
FIG. 1 is a schematic view showing a conventional ultrasonic flowmeter including ring-shaped ultrasonic transducers as a transmitter and a receiver.

FIG. 1 is a schematic view of a conventional ultrasonic flowmeter including ring-shaped ultrasonic transducers 1a and 1b, respectively acting as a transmitter and a receiver, provided around a tube 2 as being away from each other by a predetermined interval (Japanese Laid-Open Patent Publication No. Hei 10-122923). The ultrasonic flowmeter uses a total of two ring-shaped ultrasonic transducer, one as a transmitter and the other as a receiver. With such a structure, the level of an ultrasonic signal is weak and it is difficult to perform measurement. With a structure in which the ultrasonic transducers are directly attached to the tube having a fluid flowing therein, reverberation that occurs due to the long ultrasonic signal influences the next ultrasonic signal that is to be transmitted or received. For this reason, the measurement cannot be performed stably.

With the above-described ultrasonic flowmeter, the ultrasonic transducers acting as a transmitter and a receiver need to be formed so as to be suited to the diameter of the tube. In addition, the tube needs to be cut when the ultrasonic transducers are attached. In general, many ultrasonic flowmeters have a structure suitable to be installed between pipes. In the case where an ultrasonic flowmeter is installed to a pipe already installed, a work of, for example, cutting the pipe is needed in order to install the ultrasonic flowmeter. For this reason, it is difficult to install the ultrasonic flowmeter to a pipe already installed.

According to an existing method for installing a flowmeter without cutting a pipe, a semicircular, annular ultrasonic transducer obtained as a result of a ring-shaped ultrasonic transducer being cut into two is installed. However, this method is not practical for the following reasons. The semicircular, annular ultrasonic transducer is formed of a ceramic material. Such an ultrasonic transducer is very difficult to be precisely produced so as to be in close contact with a tube, and production thereof costs high.

SUMMARY

The present invention made in consideration of the above-described problems has an object of providing an ultrasonic flowmeter capable of increasing the amplitude of, and the receiving sensitivity for, an oscillated signal.

An ultrasonic flowmeter according to the present invention is characterized in that the ultrasonic flowmeter includes two or more ultrasonic transducers on a transmission side and two or more ultrasonic transducers on a receiving side, located as being away from each other on an outer surface of a tube having a fluid flowing therein, wherein the two or more ultrasonic transducers located on the transmission side are driven so as to press the tube at substantially the same pressure to increase an amplitude of an ultrasonic wave.

The ultrasonic flowmeter according to the present invention is characterized in that the ultrasonic transducers are driven at a frequency corresponding to a wavelength longer than, of equal to, a diameter of the tube to excite a guide wave.

The ultrasonic flowmeter according to the present invention is characterized in further including adjustment members converting an ultrasonic signal into an ultrasonic signal suitable to measurement, wherein the adjustment members being provided between the tube and the ultrasonic transducers, the adjustment members each have a curved surface or a groove at a surface thereof contacting the tube.

The ultrasonic flowmeter according to the present invention is characterized in that the ultrasonic transducers are located on the tube axial-symmetrically and are driven in the same phase.

The ultrasonic flowmeter according to the present invention is characterized in that the ultrasonic transducers are of one shape selected from the group consisting of a cylindrical shape, a polygonal column shape, a column-like shape, a plate-like shape and a flat plate-like shape.

The ultrasonic flowmeter according to the present invention is characterized in that the ultrasonic flowmeter further including an accommodation body having a curved or tapered outer shape.

The ultrasonic flowmeter according to the present invention is characterized in that the accommodation body keeps the ultrasonic transducers as being away from each other by a predetermined distance and is detachably provided to the tube.

The ultrasonic flowmeter according to the present invention is characterized in that the accommodation body has an opening usable to observe the fluid flowing in the tube.

REFERENCE SIGNS LIST 1, 12a-12f: Ultrasonic transducer
2, 10: Tube
14: Adjustment member
20: Accommodation body
22: Opening
24: Hinge
26: Accommodation portion
28: Non-contact portion

DESCRIPTION OF EMBODIMENTS

Hereinafter, an ultrasonic flowmeter according to the present invention will be described with reference to the drawings. The ultrasonic flowmeter according to the present invention is not to be construed as being limited to any of the embodiments or the examples described below. In the figures referred to in the embodiments and the examples, the same elements or elements having substantially the same functions will bear the same reference signs and the descriptions thereof will not be repeated.

A generally used ultrasonic flowmeter is a device that detects a bulk wave (longitudinal wave or transverse wave), transmitted from an ultrasonic transmitter, by an ultrasonic receiver. By contrast, an ultrasonic flowmeter according to the present invention, unlike the generally used ultrasonic flowmeter, excites a guide wave by an ultrasonic transmitter and receives the guide wave propagated in a fluid inside a tube by an ultrasonic receiver to measure the flow rate of the fluid inside the tube.

In this specification, the term "guide wave" is a generic term referring to the propagation form of an ultrasonic wave propagated in a longitudinal direction in a medium surrounded by border planes provided at an interval shorter than the wavelength of the ultrasonic wave, such as tubes, plates, rods, railway rails or the like. Unlike in the case of the bulk wave, in the case of a guide wave, a longitudinal wave and a transverse wave, mode-converted at the border of the medium, are not separated from each other, and the guide wave is excited by driving an ultrasonic transducer at a frequency corresponding to a wavelength that is longer than, or equal to, a diameter of the tube. The guide wave is observed when the tube is not hollow, namely, is filled with a fluid.

The present inventors disclosed an ultrasonic flowmeter using a guide wave in Japanese Laid-Open Patent Publication No. 2007-298275. The ultrasonic flowmeter in Japanese Laid-Open Patent Publication No. 2007-298275 includes two ultrasonic transducers provided at an interval of distance L on an outer circumferential surface of a tube having a fluid flowing therein. One of the two ultrasonic transducers, used as a transmission-side transducer, and the other ultrasonic transducer, used as a receiving-side transducer, are actuated alternately. The ultrasonic transducers are driven to excite a guide wave by use of the tube and the fluid inside the tube as one medium. A propagation time required for the guide wave to propagate between the two ultrasonic transducers that are away from each other by distance L from the upstream side to the downstream side, and a propagation time required for the guide wave to propagate from the downstream side to the upstream side, are found. Based on a difference between these types of propagation time, the flow rate of the fluid is found.

This will be described more specifically. The ultrasonic flowmeter in Japanese Laid-Open Patent Publication No. 2007-298275 includes two ultrasonic transducers provided at an interval of distance L on an outer surface of the tube having a fluid flowing therein. One of the two ultrasonic transducers acts as a transmission-side transducer, and the other ultrasonic transducer acts as a receiving-side transducer. The ultrasonic flowmeter includes a control/analysis device that actuates the two ultrasonic transducers mutually and finds the flow rate of the fluid as follows. The ultrasonic transducers are driven at a frequency corresponding to a wavelength longer than, or equal to, the diameter of the tube to excite a guide wave by use of the tube and the fluid inside the tube as one medium. The flow rate of the fluid is found based on a difference between propagation time $T_1$ required for the guide wave to propagate between the two ultrasonic transducers that are away from each other by distance L from the upstream side to the downstream side, and propagation time $T_2$ required for the guide wave to propagate from the downstream side to the upstream side. The ultrasonic transducers are shaped so as to be attached to a part of the outer surface of the tube in a circumferential direction.

A flow rate of a fluid and a phase velocity and a group velocity of a guide wave have the following relationship.

$$V(v) = V(0) + \alpha v$$

$$vg(v) = vg(0) + \beta v$$

In the above, $\alpha$ is a factor representing an influence exerted by the flow rate of the fluid inside the tube on the phase velocity of the guide wave, and $\beta$ is a factor representing an influence exerted by the flow rate of the fluid inside the tube on the group velocity of the guide wave.

The progagation time required for the guide wave to propagate from the upstream side to the downstream side is represented by the following expression.

$$T_1 = L/(vg(0) + \beta v)$$

Similarly, the progagation time required for the guide wave to propagate from the downstream side to the upstream side is represented by the following expression.

$$T_2 = L/(vg(0) - \beta v)$$

Therefore, the ultrasonic flowmeter in Japanese Laid-Open Patent Publication No. 2007-298275 finds the propagation time difference by the following expression.

$$\Delta T = T_2 - T_1 = 2L\beta v/vg^2(0) \times (1 + \beta^2 v^2/vg^2(0) + \ldots) \approx 2L\beta v/(vg^2(0)) = v/\gamma$$

In the above expression, L is the distance between the two ultrasonic transducers, v is the flow rate of the fluid, vg is the group velocity of the guide wave, β is a factor representing an influence exerted by the flow rate of the fluid inside the tube on the group velocity of the guide wave, and $\gamma=vg^2(0)/2L\beta$.

In order to realize flow rate measurement at a higher precision than the precision realized by the ultrasonic flowmeter in Japanese Laid-Open Patent Publication No. 2007-298275, the present inventors studied how to improve the amplitude of, and the receiving sensitivity for, an excited signal. The present inventors unexpectedly found that provision of two or more ultrasonic transducers on the transmission side increases the amplitude of, and the receiving sensitivity for, an excited signal, and moreover that the amplitude and the receiving sensitivity are increased to a level much higher than twice of the level realized otherwise. Thus, the present inventors completed the present invention.

Figure 2:
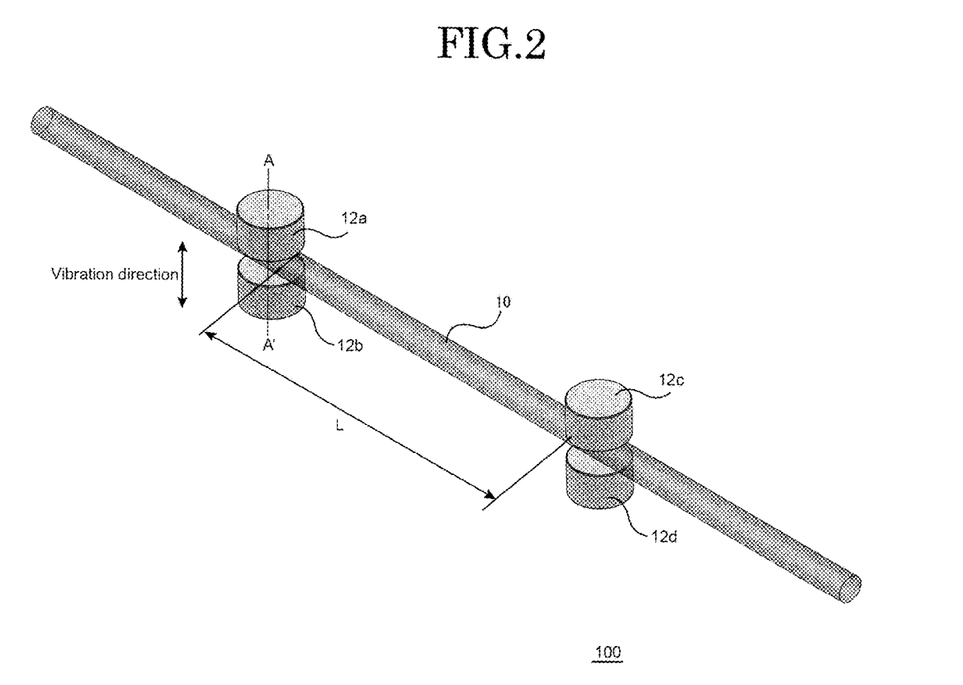
FIG. 2 is a schematic view showing an ultrasonic flowmeter according to the present invention.

FIG. 2 is a schematic view showing an ultrasonic flowmeter 100 in an embodiment according to the present invention. The ultrasonic flowmeter 100 includes two or more ultrasonic transducers 12a through 12d located on the transmission side and on the receiving side as being away from each other by distance L on an outer surface of a tube 10 having a flow path by which a fluid to be measured flows in a longitudinal direction of the tube 10. FIG. 2 shows an example in which two ultrasonic transducers are located on the transmission side and two ultrasonic transducers are located on the receiving side. In FIG. 2, two ultrasonic transducers 12a and 12b (or 12c and 12d) are located axial-symmetrically (so as to face each other) on the outer surface of the tube 10. The present invention is not limited to having such a structure, and the ultrasonic transducers may be located asymmetrically on the outer surface of the tube 10 as long as the effect of the invention of the present application that the amplitude of, and the receiving sensitivity for, a signal are improved is provided. Distance L may be set to any value in a range in which the guide wave can be received.

With the ultrasonic flowmeter 100, the two or more ultrasonic transducers 12a and 12b (or 12c and 12d) located on the transmission side are driven in the same phase so as to press the tube 10 at substantially the same pressure. Herein, the expression that "the ultrasonic transducers 12a and 12b (or 12c and 12d) are driven in the same phase" means that the two or more ultrasonic transducers 12a and 12b (or 12c and 12d) located on the transmission side are actuated at the same timing. According to the present invention, the ultrasonic transducers 12a and 12b (or 12c and 12d) located on the transmission side are driven in the same phase so as to press the tube 10 at substantially the same pressure. As a result, a splendid effect of increasing the amplitude, which is not provided merely by locating two or more ultrasonic transducers, is provided.

The ultrasonic flowmeter 100 may excite only axial vibration modes, among the modes of the guide wave, to the tube 10 to increase the amplitude of the ultrasonic wave. Among the axial vibration modes, L(0, 4) is independent from the group velocities of the other modes and is suitable to measurement. Therefore, the L(0, 4) mode is preferably usable for the ultrasonic flowmeter 100 according to the present invention. The axial vibration modes will be described later in detail.

The ultrasonic transducers 12a through 12d according to the present invention are preferably cylindrical. Alternatively, the ultrasonic transducers 12a through 12d may be polygonal column-like, column-like, plate-like, or flat plate-like as long as having a surface that contacts the tube 10 and generates a guide wave. Ultrasonic transducers of a shape having a pierced corner, for example, of a polygonal column-like shape are easily chipped away and do not generate an ultrasonic wave easily. By contrast, ultrasonic transducers of a cylindrical shape are not easily chipped away, are produced at low cost, generate an ultrasonic wave easily, and thus have stable characteristics. A set of ultrasonic transducers including two or more ultrasonic transducers located on the transmission side or on the receiving side preferably have the same size and the same shape. The present invention is not limited to having such a structure, and the ultrasonic transducers do not absolutely need to have the same size or the same shape as long as the ultrasonic transducers can be driven in the same phase so as to press the tube 10 at substantially the same pressure.

According to the present invention, two or more ultrasonic transducers are located on the transmission side. As described above, the propagation time required for the guide wave to propagate between the ultrasonic transducers from the upstream side to the downstream side, and the propagation time required for the guide wave to propagate from the downstream side to the upstream side, are measured alternately. Therefore, the number of the ultrasonic transducers located on the transmission side and the number of the ultrasonic transducers located on the receiving side are the same with each other. By contrast, the flow rate of the fluid and the propagation time required for the guide wave to propagate from the upstream side to the downstream side have a positive correlation, and the flow rate of the fluid and the propagation time required for the guide wave to propagate from the downstream side to the upstream side have a negative correlation. Therefore, according to the present invention, two or more ultrasonic transducers may be located either on the upstream side or on the downstream side of the tube 10 to act as the transmission-side ultrasonic transducers.

Now, the axial vibration modes will be described in detail. A vibration (or deformation) direction of the ring-shaped ultrasonic transducers located as described above regarding the conventional ultrasonic flowmeter is parallel to the longitudinal direction of the tube 10. By contrast, the ultrasonic transducers 12a through 12d according to the present invention that are shaped and located as described above vibrate vertically with respect to the tube 10. With the ultrasonic flowmeter 100 according to the present invention, in order to excite a guide wave, the ultrasonic transducers 12a and 12b (or 12c and 12d) are driven at a frequency corresponding to a wavelength longer than, or equal to, the diameter of the tube 10 so as to vibrate vertically with respect to the tube 10.

Figure 3A:
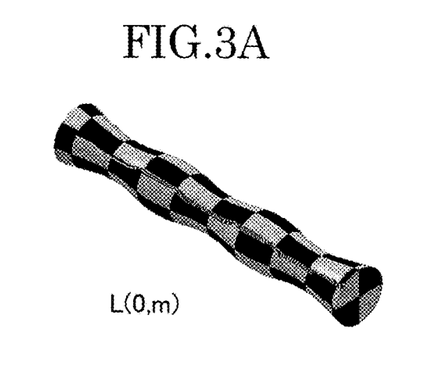
FIG. 3A provides conceptual views showing vibration of a guide wave.
Figure 3B:
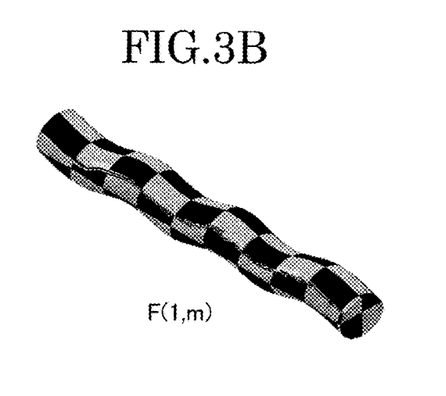
FIG. 3B provides conceptual views showing vibration of a guide wave.
Figure 3C:
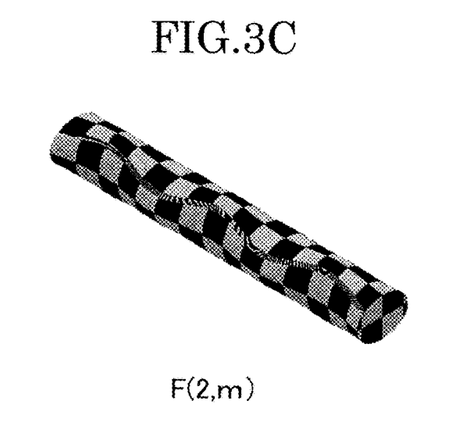
FIG. 3C provides conceptual views showing vibration of a guide wave.

FIGS. 3A to 3C provide conceptual views of vibration of the guide wave. The mode of vibration of the guide wave is classified by the type of symmetry in a circumferential direction. FIG. 3A L(0, m) mode has axial symmetry. FIG. 3B F(1, m) mode has 360-degree symmetry and has a high excitation efficiency. FIG. 3C F(2, m) mode has 180-degree symmetry but has a very low excitation efficiency. The L(0, m) mode has axial-symmetry. Therefore, when the guide wave is vibrated axial-symmetrically, the amplitude of the guide wave of an axial-symmetrical mode is increased, which is preferable. By integrating the signals received by the plurality of receivers, only the amplitude of the L(0, m) mode is amplified. Therefore, the amplitude of, and the receiving sensitivity for, the excited signal are increased, and mode selection of the excited wave is made possible.

The guide wave has velocity dispersion characteristics (frequency dependence). Therefore, L(0, 4) may be made independent from the group velocities of the other modes by selecting a frequency band at which the guide wave is excited. This improves the receiving sensitivity. Thus, the L(0, 4) mode is suitable to measurement. With the ultrasonic flowmeter 100 according to the present invention, the two or more ultrasonic transducers 12a and 12b (or 12c and 12d) located on the transmission side are driven so as to press the tube 10 at substantially the same pressure. Thus, a splendid effect of increasing the amplitude of the guide wave of the L(0, 4) mode, which is not provided merely by locating two or more ultrasonic transducers, is provided. As a result of this, the S/N ratio of the guide wave received by the ultrasonic transducers 12 on the receiving side (ratio of intensity of signals received before and after the guide wave is excited by driving the ultrasonic transducers 12a and 12b (or 12c and 12d) on the transmission side) is made very high, which improves the receiving sensitivity. By contrast, with the F(2, m) mode, the S/N ratio of the received guide waves is small. Thus, the F(2, m) mode is not suitable to the ultrasonic flowmeter 100 according to the present invention.

(Adjustment Members)

Figure 5:
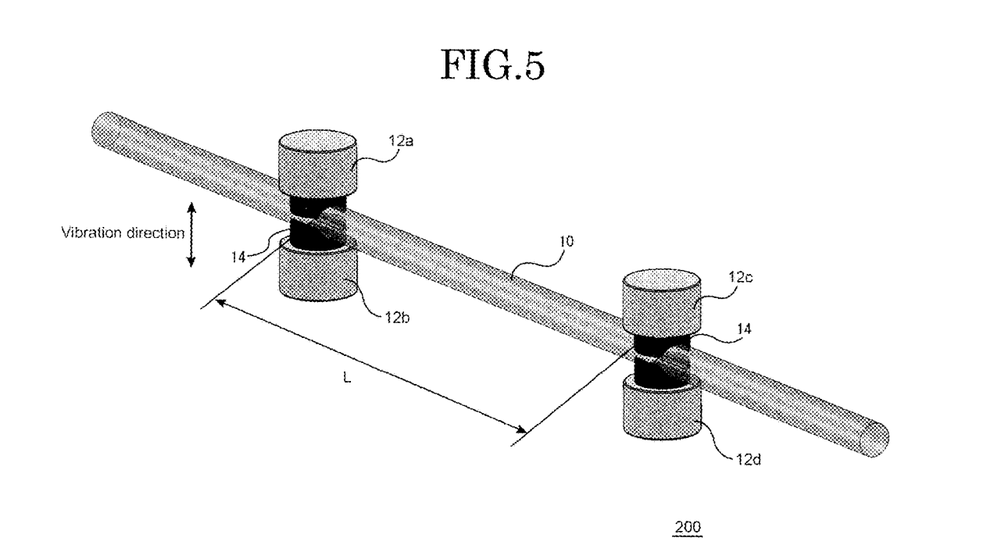
FIG. 5 is a schematic view showing an ultrasonic flowmeter according to the present invention.

In one embodiment, as shown in FIG. 5, the ultrasonic flowmeter 100 according to the present invention includes adjustment members 14 between the tube 10 and the ultrasonic transducers 12a through 12d. The adjustment members 14 convert an ultrasonic signal into an ultrasonic signal suitable to ultrasonic signal measurement. Preferably, the adjustment members 14 each have a curved surface at a surface that contacts the tube 10 in order to efficiently transfer the ultrasonic wave generated by driving the ultrasonic transducers 12a and 12b (or 12c and 12d) to the tube 10 and prevent the tube 10 from being deformed. The surface of each of the adjustment elements 14 that contacts the tube 10 is not limited to being curved and may have any other shape as long as it is guaranteed that the adjustment element 14 and the tube 10 closely contact each other.

The adjustment elements 14 are provided between the tube 10 having a fluid flowing therein and the ultrasonic transducers 12a through 12d, and the tube 10 is held between the adjustment elements 14. With such a structure, the ultrasonic signal excited by the ultrasonic transducers 12a and 12b (or 12c and 12d) is transferred to the tube 10 efficiently, and the ultrasonic signal is attenuated to be shortened. Thus, stable measurement is made possible. A reason for this is as follows. Ultrasonic signals are oscillated continually, a transmitted ultrasonic signal is attenuated quickly by the adjustment elements 14, and thus reverberation is prevented from overlapping the ultrasonic signal to be oscillated next. According to the present invention, the adjustment elements 14 transfer the ultrasonic signal transmitted from the ultrasonic transducers 12a and 12b (or 12c and 12d) to the tube 10 efficiently. Therefore, reverberation is not likely to remain, and the ultrasonic signal from the ultrasonic transducers 12a and 12b (or 12c and 12d) on the transmission side is attenuated quickly. For this reason, with the ultrasonic flowmeter 100 according to the present invention, the S/N ratio of the guide waves received by the ultrasonic transducers 12c and 12d (or 12a and 12b) on the receiving side is very high, and thus the receiving sensitivity is improved.

In general, the tube 10 has a lower hardness than that of the ultrasonic transducers 12. Therefore, it is preferable that the adjustment members 14 according to the present invention are formed of a material having a hardness higher than that of the tube 10 and lower than that of the ultrasonic transducers 12. The adjustment elements 14 may be formed of, for example, carbon-fiber reinforced polymer (CFRP), silicone sheet, aluminum, ebonite, magnesium, polyphenylenesulfide resin (PPS) or the like, but the material of the adjustment elements 14 is not limited to these materials. Especially, carbon-fiber reinforced polymer, which can transfer an ultrasonic signal excited from the ultrasonic transducers 12 to the tube 10 efficiently, is preferable for the adjustment elements 14 according to the present invention. In the case where carbon-fiber reinforced polymer is used for the adjustment elements 14 according to the present invention, it is preferable to use a material with which the carbon fibers are stacked vertically with respect to the surfaces of the adjustment elements 14 that contact the ultrasonic transducers 12. In the case where the carbon fibers contained in the adjustment elements 14 have a property of being aligned in this manner, the ultrasonic signal transmitted from the ultrasonic transducers 12 is transferred to the tube 10 efficiently, and the ultrasonic signal from the ultrasonic transducers 12 on the transmission side is attenuated quickly.

From the point of view of the closeness of contact with the tube 10, an amorphous material such as grease, a gel sheet or the like may be used for the adjustment members 14. The grease or gel sheet may be combined with any of the above-described materials having a predetermined shape and may be located on the surface of each adjustment member 14 that contacts the tube 10.

The shape of the adjustment members located between the tube 10 having a fluid flowing therein and the ultrasonic transducers may be made close to the round shape of the outer circumference of the tube, or a groove may be formed in the adjustment members so that the adjustment members are pressed onto the tube via the groove, in order to prevent the tube from being deformed. The present invention is not limited to having such a structure.

Figure 4A:
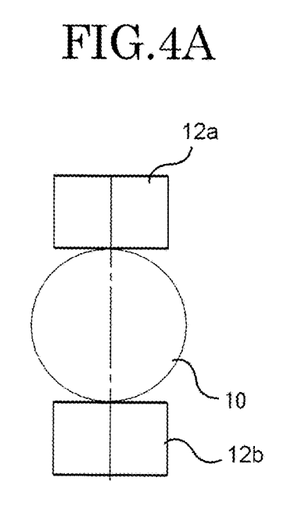
FIG. 4A provides schematic views showing positioning arrangements of the ultrasonic transducers provided on a tube.
Figure 4B:
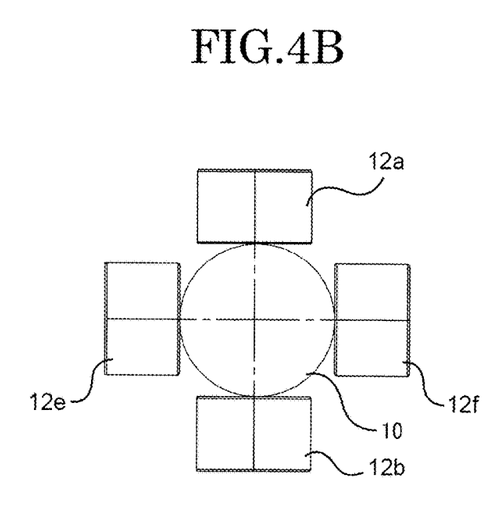
FIG. 4B provides schematic views showing positioning arrangements of the ultrasonic transducers provided on a tube.
Figure 4C:
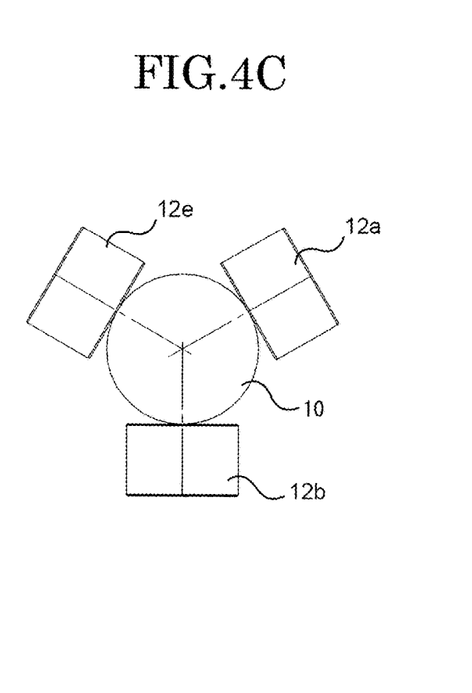
FIG. 4C provides schematic views showing positioning arrangements of the ultrasonic transducers provided on a tube.
Figure 4D:
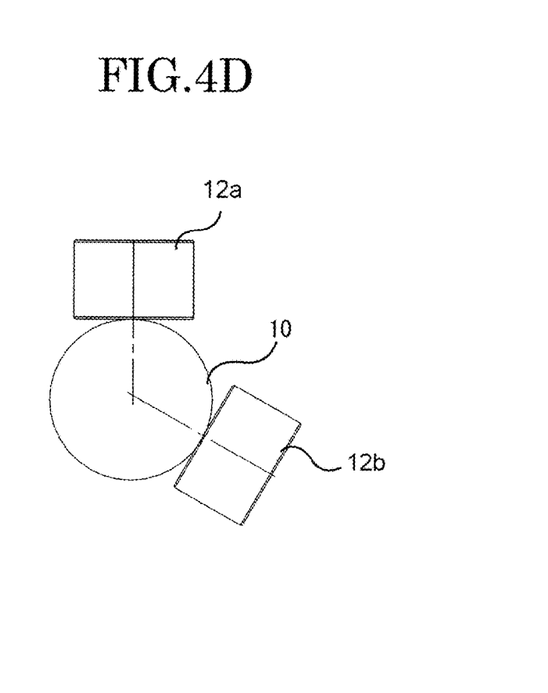
FIG. 4D provides schematic views showing positioning arrangements of the ultrasonic transducers provided on a tube.

FIG. 4A to 4D provide schematic cross-sectional views of the tube 10 showing positioning arrangements of the ultrasonic transducers 12a and 12b provided on the tube 10 as a transmitter and a receiver. The cross-sections shown in FIG. 4A to 4D are taken along line A-A' in FIG. 2. The ultrasonic transducers 12a and 12b are attached to the circumference of the tube 10 axial-symmetrically, and are excited in the same phase to receive a signal. FIG. 4A a pair of axial-symmetrical ultrasonic transducers, namely, the ultrasonic transducers 12a and 12b, are attached to the circumference of the tube 10 in a vertical direction. FIG. 4B pairs of axial-symmetrical ultrasonic transducers, specifically, four ultrasonic transducers 12a, 12b, 12e and 12f, are attached to the circumference of the tube 10 in a vertical direction and a horizontal direction. FIG. 4C a set of axial-symmetrical ultrasonic transducers, specifically, three ultrasonic transducers 12a, 12b and 12e, are attached to the circumference of the tube 10 at an angle of 120 degrees. Alternatively, as described above, with the ultrasonic flowmeter 100 according to the present invention, two or more ultrasonic transducers 12a and 12b may be located on the circumference of the tube 10 asymmetrically FIG. 4D in a range in which the effect of the invention of the present application that the amplitude of, and the receiving sensitivity for, the signal are increased is provided. Three or more ultrasonic transducers may also be located asymmetrically in this manner.

With the ultrasonic flowmeter 100 according to the present invention, a set of two ultrasonic transducers on the transmission side and a set of two ultrasonic transducers on the receiving side, namely, a total of four ultrasonic transducers 12a through 12d, are used. These ultrasonic transducers 12a through 12d are attached vertically with respect to the central axis of the tube 10, and an ultrasonic signal is excited vertically. As a result, the ultrasonic signal is increased to a level that is measurable. In the case where two sets of ultrasonic transducers, each including three or more ultrasonic transducers, namely, a total of six or more ultrasonic transducers, are used, the same effect is provided. The ultrasonic flowmeter 100 according to the present invention is different from a conventional V-shaped reflection-type (clamp-on type) ultrasonic flowmeter. Therefore, in the case where the ultrasonic flowmeter 100 includes two or more ultrasonic transducers on the transmission side, the receiving sensitivity is increased by the effect of increasing the amplitude of the guide wave.

With the ultrasonic flowmeter 100 according to the present invention, the voltages to be applied to the two or more ultrasonic transducers 12a and 12b (or 12c and 12d) located on the transmission side may be of the same phase (the timing to drive the ultrasonic transducers 12 and the level of vibration may be the same). As a result of this, vibration of the axial vibration modes, especially, of only the L(0, 4) mode, is excited to the tube 10 to increase the vibration of the ultrasonic wave. Thus, the S/N ratio is increased, and the receiving sensitivity is increased.

The ultrasonic flowmeter 100 according to the present invention is different from the conventional V-shaped reflection type ultrasonic flowmeter. Therefore, the ultrasonic transducers 12a through 12d, namely, the ultrasonic transducers located on the transmission side and on the receiving side do not need to be attached parallel to each other, and may be attached at different angles. Such a structure reduces the influence of an ultrasonic signal (standing wave) transferred to an accommodation body described below.

In one embodiment, the flowmeter 100 according to the present invention includes an accommodation body that detachably accommodates the tube 10. The accommodation body is, for example, an accommodation body 20 shown in FIG. 8 having an opening 22 through which the fluid flowing in the tube 10 is observable. Preferably, the accommodation body 20 has a curved or tapered outer shape to reduce the standing wave transferred to the accommodation body 20. A reason for this is that in the case where the accommodation body 20 includes a parallel portion or a straight portion over the entirety thereof, the accommodation body 20 is resonated, which influences the ultrasonic signal received by the ultrasonic transducers 12.

Figure 8:
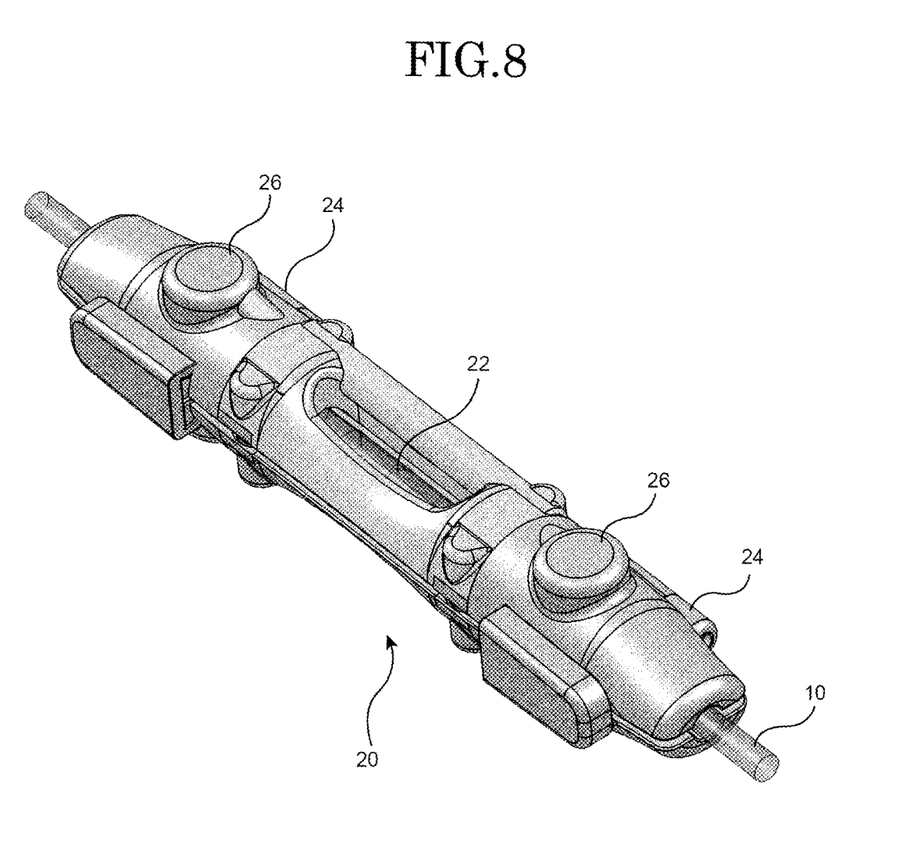
FIG. 8 is a schematic view showing an accommodation body accommodating the ultrasonic flowmeter.

In one embodiment, it is preferable that the accommodation body 20 is dividable into two to be openable and closable by link members 24, so that the accommodation body 20 accommodating the tube 10 is structured so as to be detachable from the tube 10. A conventional ultrasonic flowmeter, once attached to the tube, does not allow the ultrasonic transducers 12 to be replaced unless the tube is broken. With the ultrasonic flowmeter 100 according to the present invention, the ultrasonic transducers are located in the detachable accommodation body 20. Such a structure allows the ultrasonic transducers to be easily attached to the tube 10, and also allows the position of the tube 10 at which the flow rate is measured to be changed on a later stage. Preferably, the ultrasonic transducers are located in the accommodation body 20 such that the distance between the ultrasonic transducers on the transmission side and the ultrasonic transducers on the receiving side is kept the same and the ultrasonic transducers are attached or detached easily. Distance L between the ultrasonic transducers 12a and 12c (or 12b and 12d) on the transmission side and on the receiving side is an important parameter for the measurement of the flow rate. Use of the accommodation body 20 according to the present invention makes it easy to attach the ultrasonic transducers 12a and 12c (or 12b and 12d).

In one embodiment, it is preferable to provide the opening 22, in a central portion of the accommodation body 20, through which the flow, bubbles, contaminants in the pipe are observable. A reason for this is that these may be factors influencing the fluid. It is preferable to provide a sufficient relief inside the accommodation body 20 in order to prevent interference between the accommodation body 20 and the tube 10. It is also preferable to provide a sufficient distance to the tube 10 from the outside of the accommodation body 20 so that the tube 10 is not easily contactable from the outside. Such a structure is provided in order to prevent the tube 10 from being influenced by vibration or another factor occurring outside the accommodation body 20.

Examples

FIG. 5 is a schematic view showing an ultrasonic flowmeter 200 in an example according to the present invention.

As shown in FIG. 5, the ultrasonic flowmeter 200 includes two ultrasonic transducers 12a and 12c (or 12b and 12d) respectively on the transmission side and on the receiving side as being away from each other by distance L, parallel to each other in the same direction, on an outer circumferential surface of the tube 10 having a fluid flowing therein. Each pair of ultrasonic transducers is both cylindrical, are located axial-symmetrically and vertically with respect to the tube 10, and therefore are vibrated axial-symmetrically. Two ultrasonic transducers 12a and 12b (or 12c and 12d) act as transmission-side ultrasonic transducers, and another two ultrasonic transducers act as receiving-side ultrasonic transducers. The two ultrasonic transducers 12a and 12b (or 12c and 12d), and the other two ultrasonic transducers are actuated alternately. The ultrasonic transducers 12 are driven to excite a guide wave by use of the tube 10 and the fluid inside the tube 10 as one medium. A propagation time required for the guide wave to propagate between the ultrasonic transducers that are away from each other by distance L from the upstream side to the downstream side, and a propagation time required for the guide wave to propagate from the downstream side to the upstream side, are found. Based on a difference between these types of propagation time, the flow rate of the fluid is found.

With the ultrasonic flowmeter 200, the ultrasonic transducers 12a and 12b (or 12c and 12d) are provided so as to press the tube 10 at substantially the same pressure. The ultrasonic transducers 12a and 12b (or 12c and 12d), which are provided axial-symmetrically, may be driven in the same phase in the L(0, m) mode to vibrate the tube 10 axial-symmetrically. As a result, vibration of only the axial vibration mode is excited to the tube 10, and the vibration of only the axial vibration mode is transferred along the direction of the flow of the fluid. The ultrasonic transducers 12a and 12b (or 12c and 12d), which are located axial-symmetrically on the outer circumference of the tube 10, are driven in the same phase. This example does not eliminate an embodiment in which the ultrasonic transducers 12a and 12b (or 12c and 12d), which are located axial-symmetrically on the outer circumference of the tube 10, are driven in opposite phases to excite with a large amplitude, and detect, a guide wave of the F(1, m) mode.

Figure 6:
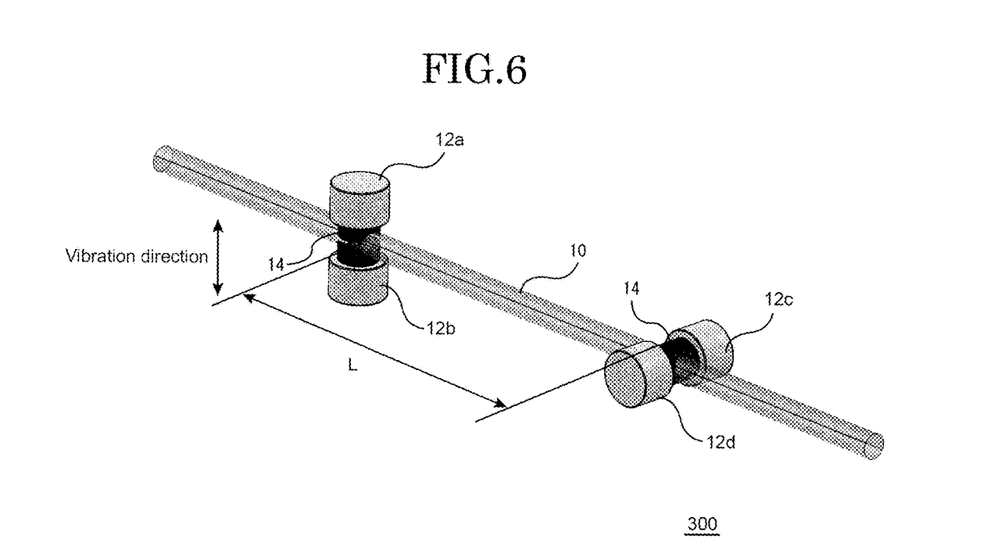
FIG. 6 is a schematic view showing another ultrasonic flowmeter according to the present invention.

FIG. 6 is a schematic view of an ultrasonic flowmeter 300 in which the ultrasonic transducers 12a and 12b (or 12c and 12d) on the transmission side and on the receiving side are located at different angles, instead of parallel to each other.

With the ultrasonic flowmeter 300, in the case where the ultrasonic transducers 12 are located in the accommodation body 20, the influence of the ultrasonic signal (standing wave) transferred to the accommodation body is reduced. A reason for this is that with the ultrasonic flowmeter 300, the standing wave is prevented from being transferred to the accommodation body in a direction parallel to the accommodation body.

In FIG. 5 and FIG. 6, the adjustment members 14 that convert an ultrasonic signal into an ultrasonic signal suitable to measurement are provided between the tube 10 and the ultrasonic transducers 12a through 12d. The adjustment members 14 each have a curved surface at a surface that contacts the tube 10 so as to be in sufficient contact with the tube 10 and thus prevent the tube 10 from being deformed. In order to put each adjustment member 14 into sufficient contact with the tube 10, the surface of the adjustment element 14 that contacts the tube 10 is curved. In order to increase the closeness of contact, grease or the like may be applied or a gel sheet may be located.

Figure 7:
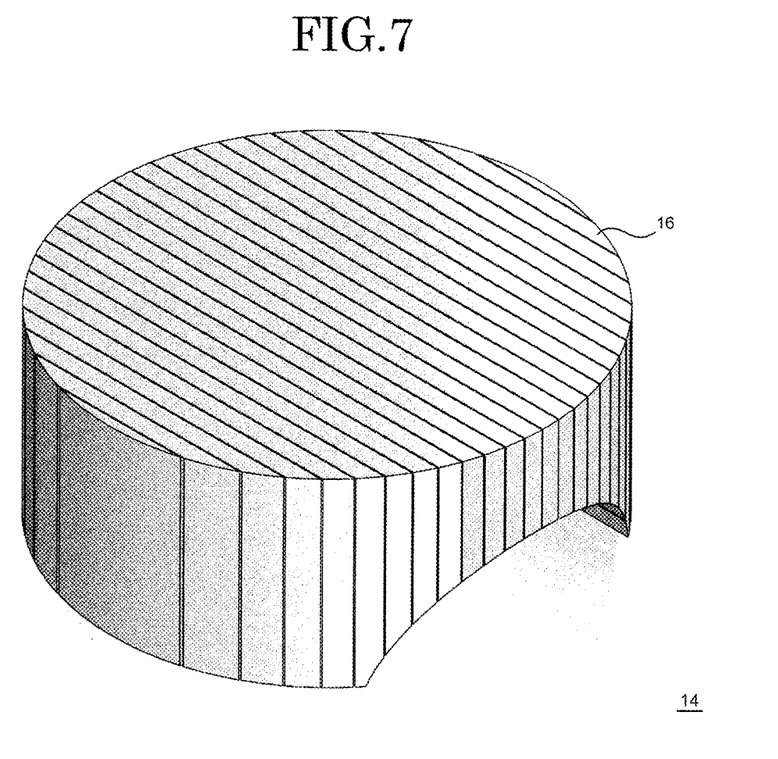
FIG. 7 is a schematic view of an adjustment member 14 according to the present invention.

The adjustment members 14 are independently provided for the ultrasonic transducers 12a and 12c located on the top side and for the ultrasonic transducers 12b and 12d located on the bottom side. FIG. 7 is a schematic view of one adjustment member 14 in an example according to the present invention. In this example, the adjustment member 14 is formed of a CFRP collective body formed by stacking CFRP members 16 in which the carbon fibers are aligned in one direction on an epoxy resin. The adjustment member 14 is formed such that the direction of the carbon fibers of the CFRP collective body is vertical with respect to the tube 10. The adjustment member 14 is formed to have a curved shape or a groove at a bottom end usable to hold the tube 10. Thus, the adjustment members 14 hold the tube 10.

Figure 9:
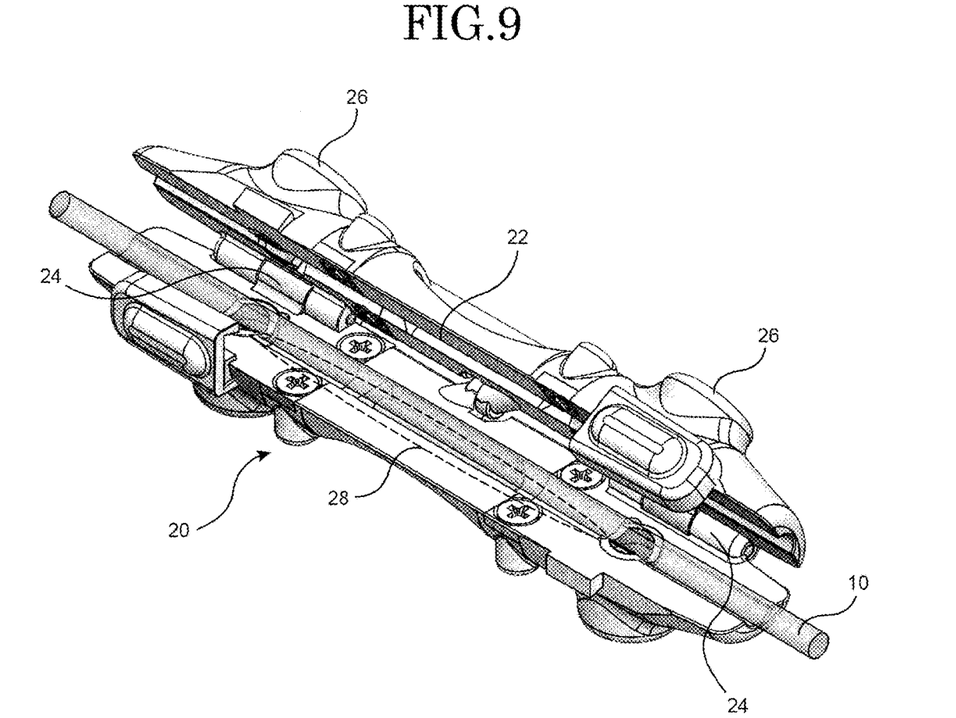
FIG. 9 is a schematic view showing the accommodation body accommodating the ultrasonic flowmeter.

FIG. 8 is a schematic view of the accommodation body 20 that detachably accommodates the tube 10. FIG. 9 is a schematic view of the accommodation body 20 in an opened state showing an internal structure thereof. The accommodation body 20 in this example has the opening 22 through which the fluid flowing in the tube 10 is observable. The outer shape of the accommodation body 20 is curved or tapered so as to reduce the standing wave transferred thereto. The accommodation body 20 includes hinges 24 that allow the tube 10 to be detachable. The accommodation body 20 includes accommodation portions 26 that accommodate the ultrasonic transducers. The accommodation body 20 includes a non-contact portion 28 in the inside thereof, in which the tube 10 contacts only the adjustment members 14 and does not contact the accommodation body 20. Such a structure reduces the influence exerted on the tube 10 by vibration occurring outside the accommodation body 20.

Figure 10A:
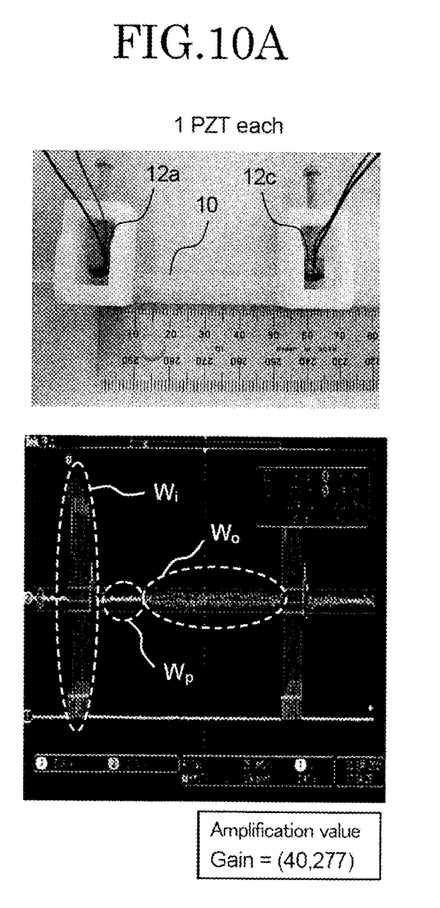
FIG. 10A shows measurement data of waveforms of ultrasonic signals.
Figure 10B:
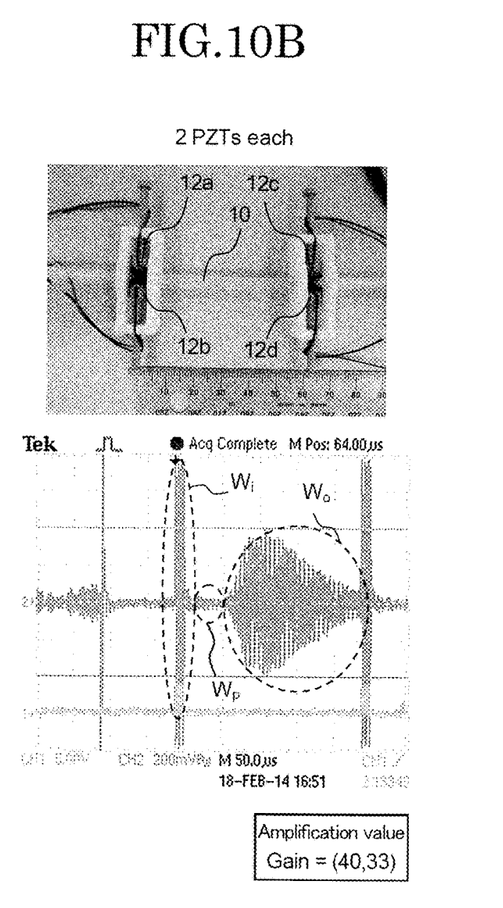
FIG. 10B shows measurement data of waveforms of ultrasonic signals.

FIGS. 10A and 10B will be described. The ultrasonic transducers 12a through 12d are formed of PZTs. FIG. 10A shows a comparative example in which one PZT is used each on the transmission side and on the receiving side (FIG. 10A), example 1 in which a pair of PZTs are used each on the transmission side and on the receiving side as in the ultrasonic flowmeter 100 according to the present invention (FIG. 10B), and the data representing the measurement results of the waveforms of the ultrasonic signals in the comparative example and example 1.

The measurement conditions were as follows.
  Material of the tube: PFA; size: ⅛ inch. (3.17×1.59)
  Interval at which the sensors were attached: 60 mm
  Pulse provided: 338 kHz, 5 pulses
  Adjustment member: grease was applied between the PZTs and the tube
  Water temperature: room temperature
  Ambient temperature: 25° C.

An output from the first-stage amplifier was observed. The gain value was fixed at 40. The waveforms of the ultrasonic waves measured are shown (FIG. 10A: one PZT; FIG. 10B: two PZTs).

In the case where two PZTs are provided, a stronger ultrasonic signal is obtained than in the case where one PZT is provided.

1 PZT: Vpp=120 mV; a pair of (2) PZTs: Vpp=792 mV

In FIG. 10A and FIG. 10B, waveform $W_i$ is the waveform of the ultrasonic wave transmitted by the ultrasonic transducer(s) on the transmission side. Waveform $W_p$ is the waveform of the guide wave that is before being received on the receiving side, and waveform $W_o$ is the waveform of the guide wave that is received on the receiving side. As is clear from FIGS. 10A and 10B, the receiving sensitivity provided in the case where two ultrasonic transducers 12a and 12b (or 12c and 12d) are located on the transmission side is much higher than twice of the receiving sensitivity provided in the case where two ultrasonic transducers are located. In the comparative example in which one ultrasonic transducer was located each on the transmission side and on the receiving side, Vpp was 120 mV. By contrast, in example 1 in which two ultrasonic transducers were located each on the transmission side and on the receiving side, Vpp was 792 mV. Vpp was amplified to higher than six times. Regarding the S/N ratio between waveform $W_p$ and waveform $W_o$, it has been made clear that the S/N ratio is significantly improved by providing two ultrasonic transducers on the transmission side, and that the ultrasonic flowmeter according to the present invention has a significantly improved sensitivity. This effect is not easily expectable.

Figure 11A:
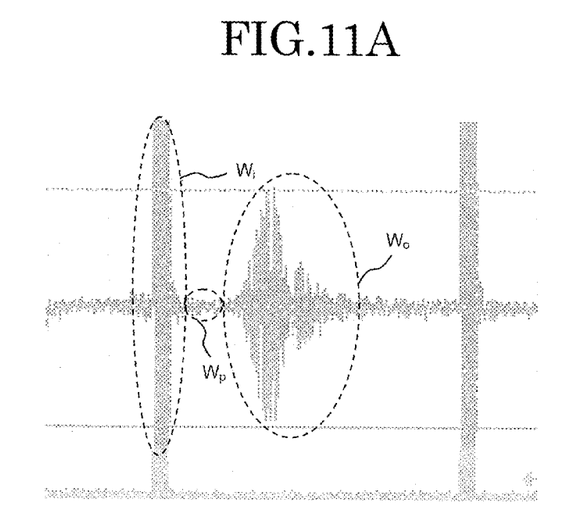
FIG. 11A shows measurement data of waveforms of ultrasonic signals.
Figure 11B:
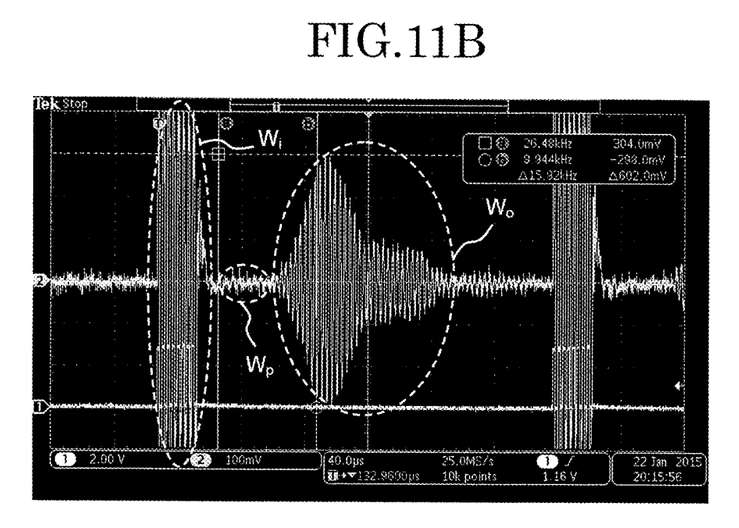
FIG. 11B shows measurement data of waveforms of ultrasonic signals.

In example 2, the effect provided by using the adjustment members 14 of a predetermined shape was studied. The adjustment members 14 were each formed of the CFRP collective body (diameter: 7.1 mm) shown in FIG. 7. Between the adjustment members 14 and the tube 10, grease was applied (FIG. 11A) or a gel sheet was located (FIG. 11B). In this example, the PZT and the CFRP collective body were bonded together with an adhesive. As shown in FIGS. 11A and 11B, with the ultrasonic flowmeter 200 including the adjustment members 14 each formed of a CFRP collective body, the waveform of the received guide wave was sharper than in the case where only the grease was applied as shown in the bottom part of FIG. 10B. Thus, the ultrasonic flowmeter 200 was found to be in a state suitable to measurement of the flow rate. In the example in which the grease was applied between the adjustment members 14 and the tube 10 (FIG. 11A) and in the example in which the gel sheet was located between the adjustment members 14 and the tube 10 (FIG. 11B), the waveform of the received guide wave was of the same level.

Figure 12A:
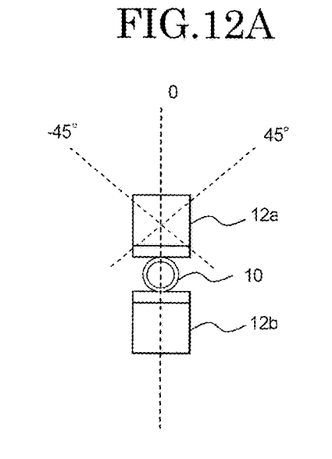
FIG. 12A shows measurement data of waveforms of ultrasonic signals.
Figure 12B:
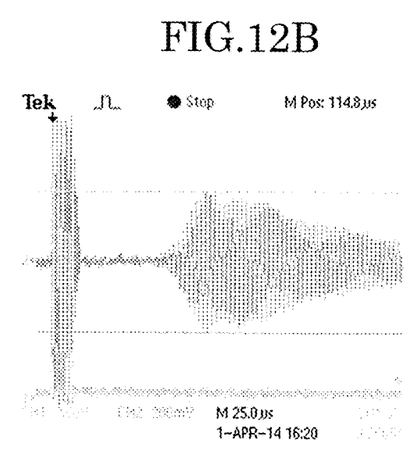
FIG. 12B shows measurement data of waveforms of ultrasonic signals.
Figure 12C:
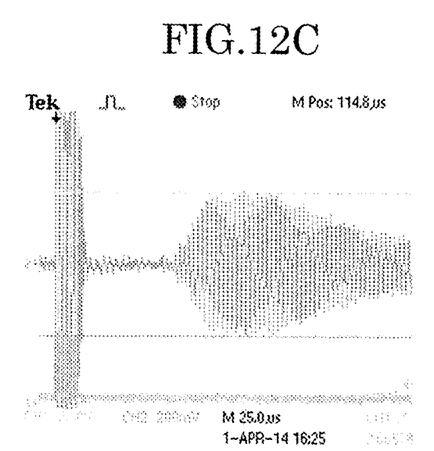
FIG. 12C shows measurement data of waveforms of ultrasonic signals.

In example 3, an influence exerted in the case where the two ultrasonic transducers 12a and 12b (or 12c and 12d) are located asymmetry on the transmission side on the outer circumference of the tube 10 of the ultrasonic flowmeter according to the present invention was studied. FIG. 12A is a schematic view showing the ultrasonic transducers 12a and 12b (or 12c and 12d) located on the outer circumference of the tube 10. FIG. 12B shows a waveform of example 1 in which the ultrasonic transducers 12a and 12b (or 12c and 12d) are located so as to face each other on the outer circumference of the tube 10. FIG. 12C shows a waveform of example 3 in which the ultrasonic transducers 12a and 12b (or 12c and 12d) are located so as to have an angle of 45 degrees with respect to each other on the outer circumference of the tube 10. From the results shown in FIGS. 12A to 12C, it has been made clear that the angle at which the ultrasonic transducers 12a and 12b (or 12c and 12d) are located does not influence the received guide wave.

As described above, the ultrasonic flowmeter according to the present invention is capable of measuring the flow rate at a high sensitivity as has not been realized conventionally.

INDUSTRIAL APPLICABILITY

An ultrasonic flowmeter according to the present invention is usable for industrially usable measurement, for example, measurement of a flow rate or measurement of a biological fluid such as blood or the like.

According to the present invention, the amplitude of, and the receiving sensitivity for, a signal excited by ultrasonic transducers are increased, and an ultrasonic signal suitable to measurement is obtained.

What is claimed is:

1. An ultrasonic flowmeter, comprising:
   two or more ultrasonic transducers on a transmission side and two or more ultrasonic transducers on a receiving side, located as being away from each other on an outer surface of a tube having a fluid flowing therein,
   wherein the two or more ultrasonic transducers located on the transmission side are driven so as to press the tube at substantially the same pressure to increase an amplitude of an ultrasonic wave,
   the ultrasonic transducers on the transmission side are driven at a frequency corresponding to a wavelength longer than, or equal to, a diameter of the tube to excite a guide wave, and
   a longitudinal wave and a transverse wave, mode-converted at the border of the tube filled with a fluid, are not separated from each other in the guide wave.

2. The ultrasonic flowmeter according to claim 1, further comprising adjustment members converting an ultrasonic signal into an ultrasonic signal suitable to measurement, wherein the adjustment members being provided between the tube and the ultrasonic transducers, the adjustment members each have a curved surface or a groove at a surface thereof contacting the tube.

3. The ultrasonic flowmeter according to claim 1, wherein the ultrasonic transducers are located on the tube axial-symmetrically and are driven in the same phase.

4. The ultrasonic flowmeter according to claim 1, wherein the ultrasonic transducers are of one shape selected from the group consisting of a cylindrical shape, a polygonal column shape, a column-like shape, a plate-like shape and a flat plate-like shape.

5. The ultrasonic flowmeter according to claim 1, further comprising an accommodation body having a curved or tapered outer shape.

6. The ultrasonic flowmeter according to claim 5, wherein the accommodation body keeps the ultrasonic transducers as being away from each other by a predetermined distance and is detachably provided to the tube.

7. The ultrasonic flowmeter according to claim 5, wherein the accommodation body has an opening usable to observe the fluid flowing in the tube.

8. The ultrasonic flowmeter according to claim 1, wherein the ultrasonic transducers on the transmission side are driven to excite an axial vibration mode, among modes of the guide wave, to the tube to increase the amplitude of the ultrasonic wave.

9. The ultrasonic flowmeter according to claim 1, wherein the ultrasonic transducers located on the tube axial-symmetrically are driven in the same phase to increase the amplitude of a guide wave of an axial-symmetrical mode.

* * * * *